US012710993B2

(12) United States Patent
Tamizhmani et al.

(10) Patent No.: US 12,710,993 B2
(45) Date of Patent: Aug. 18, 2026

(54) SYSTEM AND METHOD FOR MINIMIZING CONTROL SYSTEM DISTURBANCES

(71) Applicant: Bank of America Corporation, Charlotte, NC (US)

(72) Inventors: Aravinthane Tamizhmani, Chennai (IN); Sandeep Pai, Chicago, IL (US)

(73) Assignee: Bank of America Corporation, Charlotte, NC (US)

( * ) Notice: Subject to any disclaimer, the term of this patent is extended or adjusted under 35 U.S.C. 154(b) by 406 days.

(21) Appl. No.: 18/404,590

(22) Filed: Jan. 4, 2024

(65) Prior Publication Data

US 2025/0224992 A1 Jul. 10, 2025

(51) Int. Cl.
*G06F 9/50* (2006.01)

(52) U.S. Cl.
CPC ............ *G06F 9/505* (2013.01); *G06F 9/5044* (2013.01)

(58) Field of Classification Search
CPC ....... G06F 9/505; G06F 9/5044; G06F 16/215
See application file for complete search history.

(56) References Cited

U.S. PATENT DOCUMENTS 8,468,244 B2 6/2013 Redlich et al.
8,504,470 B1 8/2013 Chirehdast
8,620,887 B2 * 12/2013 Kheyfets ................ G06Q 40/12 707/601
8,669,986 B2 * 3/2014 Garmon ................. G01D 13/12 702/179
8,719,151 B2 5/2014 Liu et al.
9,076,185 B2 7/2015 Orfano
9,514,632 B2 12/2016 Hunter et al.
9,646,075 B2 5/2017 Riggs
9,849,364 B2 12/2017 Tran et al.
11,159,909 B2 10/2021 Anderson
11,673,583 B2 6/2023 Raichelgauz et al.
12,174,808 B2 * 12/2024 Tamizhmani ......... G06F 16/215
12,567,004 B2 * 3/2026 Wang ..................... G06N 20/00
2008/0228867 A1 * 9/2008 Murphy ................ G06F 21/305 709/203

(Continued)

OTHER PUBLICATIONS

Martin "A Comparison of Two Disturbance Reduction Methods for Discrete Time Systems", 1992 IEEE, pp. 13-15.*

(Continued)

*Primary Examiner* — Van H Nguyen

(57) ABSTRACT

A method includes receiving a data population and a plurality of constraints. The method includes representing a plurality of units corresponding to the data population by a first set of vectors, determining a holistic feature, and representing the holistic feature by a second vector. The method further includes defining a target volume based on a subset of the plurality of constraints, and for each unit, subtracting a vector representing a respective unit from a vector representing a current holistic feature to determine a third vector. The method thus includes instantiating a first data bucket and a second data bucket based on the plurality of units and the units corresponding to the current data population, and for each third vector, transferring units from the first data bucket to the second data bucket so as to cause the holistic feature to converge to the current holistic feature defined by the target volume.

20 Claims, 5 Drawing Sheets

(56) References Cited

U.S. PATENT DOCUMENTS

| | | | |
|---|---|---|---|
| 2011/0047058 | A1 | 2/2011 | Erbey et al. |
| 2019/0213498 | A1 | 7/2019 | Adjaoute |
| 2019/0253670 | A1 | 8/2019 | Chien |
| 2020/0027096 | A1 | 1/2020 | Cooner |
| 2020/0167631 | A1 | 5/2020 | Rezgui |
| 2020/0311816 | A1 | 10/2020 | Calvin |
| 2020/0387896 | A1 | 12/2020 | Tran et al. |
| 2021/0042830 | A1 | 2/2021 | Burke |
| 2021/0173711 | A1 | 6/2021 | Crabtree et al. |
| 2022/0040557 | A1 | 2/2022 | Tran |

OTHER PUBLICATIONS

Krohling et al. "Design of Optimal Disturbance Rejection PID Controllers Using Genetic Algorithms", 2001 IEEE, pp. 78-82.*
Liu et al. "Disturbance Elimination of Ultra-precision Micro-motion Platform by Adaptive Inverse Approach", 2010 IEEE, 5 pages.*
Aravinthane Tamizhmani, et al.; U.S. Appl. No. 18/163,784; Reducing a number of units in a data population based on predefined constraints; filed Feb. 2, 2023.

* cited by examiner

300a

SYSTEM AND METHOD FOR MINIMIZING CONTROL SYSTEM DISTURBANCES

TECHNICAL FIELD

The present disclosure relates generally to control system disturbances, and more specifically to a system and method for minimizing control system disturbances.

BACKGROUND

A data population including a plurality of units may have an overall feature (e.g., a holistic feature) that can be determined from individual features of all of the units of the data population. The holistic feature may be further associated with a control system, and thus the holistic feature may be subjected to one or more control system disturbances.

SUMMARY

The system and methods implemented by the system as disclosed in the present disclosure provide technical solutions to the technical problems discussed above by providing systems and methods for minimizing control system disturbances. The disclosed system and methods provide several practical applications and technical advantages.

The present embodiments are directed to systems and methods for minimizing control system disturbances. In certain embodiments, a control system may be utilized to control one or more signal characteristics associated with a system. For example, in one embodiment, the control system may be utilized to maintain the one or more signal characteristics associated with the system within a number of signal characteristic thresholds. For example, in one embodiment, one or more signals associated with the system may include a normal distribution, and thus the number of signal characteristic thresholds may include a mean signal threshold and a standard deviation signal threshold. However, in some instances, the one or more signal characteristics may be subjected to one or more control system disturbances, which may cause the one or more signal characteristics associated with the system markedly deviate beyond the number of signal characteristic thresholds.

Thus, in accordance with the presently disclosed embodiments, it may be useful to provide a target offset signal to be added to the one or more signals associated with the system to minimize (e.g., dampen) the effects of the control system disturbances, such that the one or more signal characteristics associated with the system is maintained within the number of signal characteristic thresholds even in the occurrence of one or more control system disturbances. In this way, the present embodiments may improve the operability, reliability, and maintainability of control systems by minimizing (e.g., dampening) the effects of control system disturbances, which would otherwise adversely impact and impede the operation and service of control systems.

In certain embodiments, one or more processors of a computing system may receive a data population and a plurality of constraints. In one embodiment, the data population may include a plurality of units, in which each unit includes a plurality of respective values. In one embodiment, each value may correspond to a respective parameter, and in which each of the plurality of constraints corresponds to a respective parameter. In certain embodiments, the one or more processors may then represent the plurality of units corresponding to the data population by a first set of vectors in a parameter space and determine a holistic feature of the data population. In certain embodiments, the one or more processors may then represent the holistic feature by a second vector in the parameter space. For example, in one embodiment, the second vector includes a linear combination of the first set of vectors.

In certain embodiments, the one or more processors may then define a target volume in the parameter space based at least in part on a subset of the plurality of constraints. In certain embodiments, for each unit of the plurality of units corresponding to a current data population, the one or more processors may subtract a vector representing a respective unit from a vector representing a current holistic feature to determine a third vector. For example, in one embodiment, the vector representing the current holistic feature may include a linear combination of vectors that represent the units corresponding to the current data population. In certain embodiments, the one or more processors may then instantiate a first data bucket and a second data bucket based at least in part on the plurality of units corresponding to the data population and the units corresponding to the current data population. For example, in one embodiment, the first data bucket may include the plurality of units corresponding to the data population.

In certain embodiments, for each third vector, the one or more processors may then transfer one or more of the plurality of units corresponding to the data population from the first data bucket to the second data bucket so as to cause the holistic feature to converge to the current holistic feature defined at least in part by the target volume. In certain embodiments, the target volume in the parameter space may be defined based at least in part on a random sampling of the plurality of constraints. In certain embodiments, the one or more processors may iteratively transfer one or more of the plurality of units corresponding to the data population from the first data bucket to the second data bucket until the holistic feature is positioned within the target volume. For example, in one embodiment, when the holistic feature is positioned within the target volume, the first data bucket may include a maximum number of units of the data population that includes the current holistic feature. In certain embodiments, the holistic feature may be determined based on a maximum number of the plurality of units corresponding to the data population. In certain embodiments, each parameter comprises a data parameter, a demographic parameter, a computer parameter, or an interaction parameter.

The disclosed system and method provide the additional practical application in areas such as computing systems having a number of computing nodes, where a desired subset of computing nodes has a desired holistic feature. The desired holistic feature may be an overall memory consumption, an overall network bandwidth, and/or an overall computing performance of the computing system, for example. The final data population may include data for a maximum number of computing nodes that have the overall memory consumption within predefined constraints, the overall network bandwidth within predefined constraints, and/or the overall computing performance within predefined constraints. For example, the final data population may include data for a maximum number of computing nodes that have a reduced overall memory consumption and/or reduced overall network bandwidth compared to the original data population, while the overall computing performance is within predefined constraints (for example, substantially unchanged compared to the original data population). Accordingly, by determining the maximum number of computing nodes based the desired holistic feature, computing resources (e.g., memory and/or network bandwidth) may be reduced while maintaining computing performance of the computing system.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Example System

Figure 1:
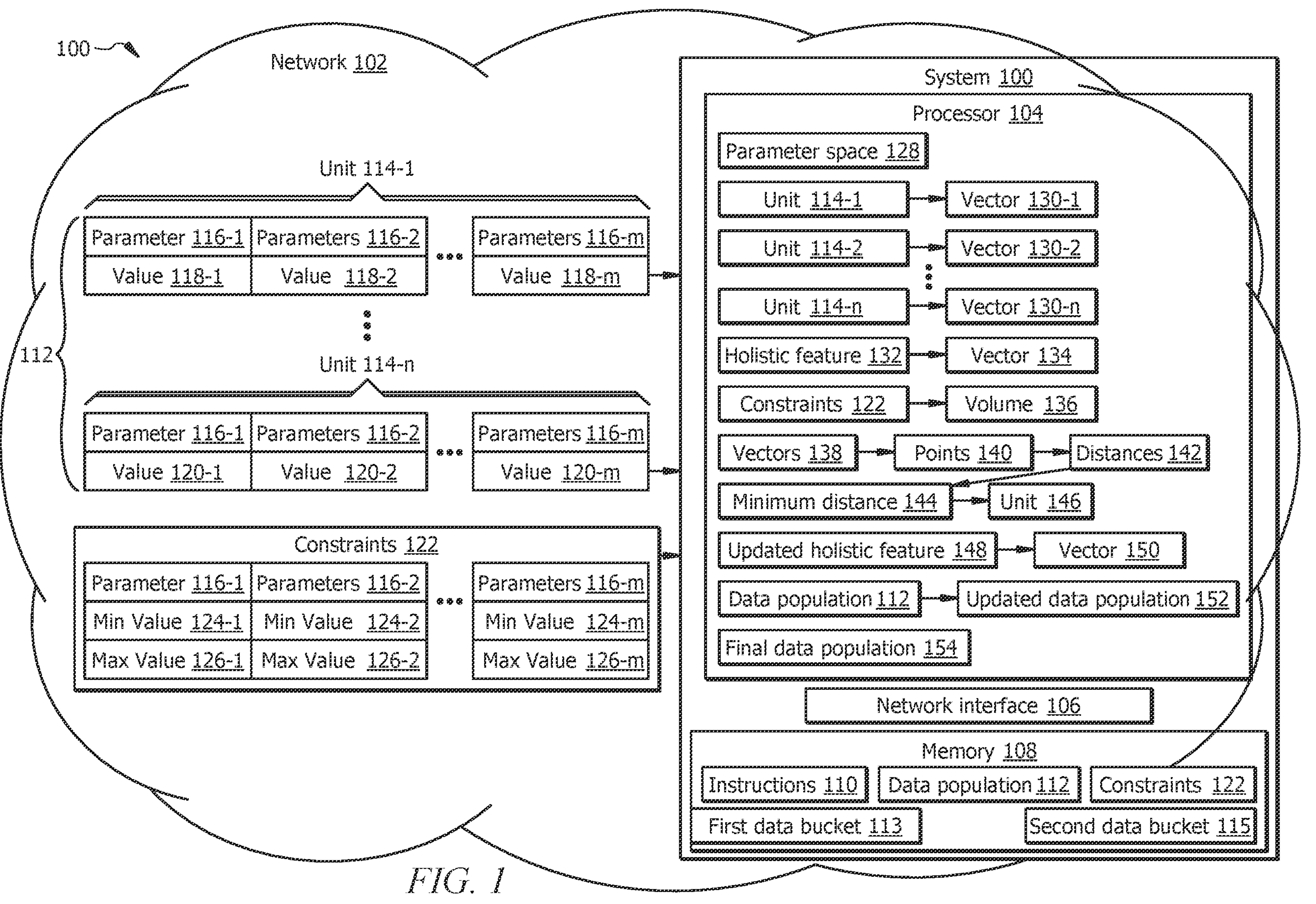
FIG. 1 is a block diagram of a system including a control system and network, in accordance with certain aspects of the present disclosure.

FIG. 1 is a block diagram of a system 100 including a control system and network, in accordance with certain aspects of the present disclosure. For example, the system 100 that is generally configured to reduce a number of units in a data population based on predefined constraints and obtain a subset of a data population that has a holistic feature that equals to a desired holistic feature within predefined constrains. The system 100 may be operably coupled to external systems via a network 102. In other embodiments, the system 100 may not have all the components listed and/or may have other elements instead of, or in addition to, those listed above. In certain embodiments, the system 100 may be configured to determine an initial holistic feature of a data population; and remove units from the data population and determine updated holistic features until a resulting subset of the data population has the final holistic feature that equals to a desired holistic feature within predefined constrains.

In certain embodiments, the network 102 may be any suitable type of wireless and/or wired network. The network 102 may or may not be connected to the Internet or public network. The network 102 may include all or a portion of an Intranet, a peer-to-peer network, a switched telephone network, a local area network (LAN), a wide area network (WAN), a metropolitan area network (MAN), a personal area network (PAN), a wireless PAN (WPAN), an overlay network, a software-defined network (SDN), a virtual private network (VPN), a mobile telephone network (e.g., cellular networks, such as 4G or 5G), a plain old telephone (POT) network, a wireless data network (e.g., WiFi, WiGig, WiMax, etc.), a long-term evolution (LTE) network, a universal mobile telecommunications system (UMTS) network, a peer-to-peer (P2P) network, a Bluetooth network, a near field communication (NFC) network, and/or any other suitable network. The network 102 may be configured to support any suitable type of communication protocol as would be appreciated by one of ordinary skill in the art.

In certain embodiments, the system 100 is generally any device that is configured to process and store data and communicate with external systems via the network 102. The system 100 may include a processor 104 in signal communication with a memory 108 and a network interface 106. In the certain embodiments, a processor 104 may include one or more processors operably coupled to the memory 108. The processor 104 is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). The processor 104 may be a programmable logic device, a microcontroller, a microprocessor, or any suitable combination of the preceding. The one or more processors are configured to process data and may be implemented in hardware or software. For example, the processor 104 may be 8-bit, 16-bit, 32-bit, 64-bit, or of any other suitable architecture. The one or more processors are configured to implement various software instructions to perform the operations described herein. For example, the one or more processors are configured to execute software instructions 110 and perform one or more functions described herein.

In certain embodiments, a network interface 106 may be utilized to enable wired and/or wireless communications (e.g., via network 102). The network interface 106 is configured to communicate data between the system 100 and other external systems. For example, the network interface 106 may include a WIFI interface, a local area network (LAN) interface, a wide area network (WAN) interface, a modem, a switch, or a router. The processor 104 is configured to send and receive data using the network interface 106. The network interface 106 may be configured to use any suitable type of communication protocol as would be appreciated by one of ordinary skill in the art.

In certain embodiments, a memory 108 may be volatile or non-volatile and may include a read-only memory (ROM), random-access memory (RAM), ternary content-addressable memory (TCAM), dynamic random-access memory (DRAM), and static random-access memory (SRAM). Memory 108 may be implemented using one or more disks, tape drives, solid-state drives, and/or the like. The memory 108 may store any of the information described in FIGS. 1 and 2 along with any other data, instructions, logic, rules, or code operable to implement the function(s) described herein when executed by the processor 104. The memory 108 is operable to store software instructions 110, and/or any other data and instructions. The software instructions 110 may include any suitable set of software instructions, logic, rules, or code operable to be executed by the processor 104.

In certain embodiments, the system 100 may be utilized to receive a data population 112 and store it in the memory 108. The data population 112 may include a plurality of units 114-1 through 114-*n*. Each unit of the data population 112 may include a number of values, such that each value corresponds to a respective parameter. For example, the unit 114-1 may include values 118-1 through 118-*m*, such that the values 118-1 through 118-*m* correspond to parameters 116-1 through 116-*m*, respectively. The unit 114-*n* may include values 120-1 through 120-*m*, such that the values 120-1 through 120-*m* correspond to the parameters 116-1 through 116-*m*, respectively. In certain embodiments, the values 120-1 through 120-*m* may be different from the values 118-1 through 118-*m*, respectively.

In certain embodiments, the data population 112 may include interaction data for a plurality of data values and the plurality of parameters 116-1 through 116-*m* may include interaction parameters. In other embodiments, the data population 112 may include demographic data for a plurality of persons and the plurality of parameters 116-1 through **116-*m* may include demographic parameters. In yet other embodiments, the data population 112 may include computing data for a plurality of computing nodes of a computing system and the plurality of parameters 116-1 through 116-*m*** may include computing parameters (such as, for example, a computing performance, a memory, and/or a network bandwidth).

In certain embodiments, the system 100 may be further utilized to instantiate a first data bucket 113 and a second data bucket 115, which may be each instantiated and stored in the memory 108. For example, as will be discussed in further detail below with respect to FIG. 2, the first data bucket 113 and the second data bucket 115 may each include virtual buckets or other similar designated virtual storage that may be utilized to store data values, transient data values, and/or time-series data. In one embodiment, the first data bucket 113 may store the plurality of units 114-1 through **114-*n* corresponding to the data population 112. In one embodiment, the second data bucket 115 may be held empty, and then utilized to store one or more the plurality of units 114-1 through 114-*n* corresponding to the data population 112 based on a transference from the first data bucket 113 to the second data bucket 115**.

In certain embodiments, the system 100 may be further utilized to receive a plurality of constraints 122 and store it in the memory 108. The constraints 122 may include minimum and maximum values that correspond to respective parameters. For example, the constraints 122 include minimum values 124-1 through **124-*m* and maximum values 126-1 through 126-*m* corresponding to the parameters 116-1 through 116-*m*, respectively. The system 100 may be further utilized to represent the units 114-1 through 114-*n* of the data population 112 by vectors 130-1 through 130-*n*, respectively, in a parameter space 128. The parameter space 128** may be a multi-dimensional space, such as an m-dimensional vector space, for example.

In certain embodiments, the system 100 may be further utilized to determine a holistic feature 132 of the data population 112. The holistic feature 132 may be determined from all of the units 114-1 through **114-*n* of the data population 112. In certain embodiments in which the data population 112 includes interaction data for a plurality of data values, the holistic feature 132 may be an overall projected gain. In certain embodiments in which the data population 112 includes demographic data for a plurality of persons, the holistic feature 132 may be an overall political lean. In certain embodiments in which the data population 112 includes computing data for a plurality of computing nodes of a computing system, the holistic feature 132 may be an overall memory consumption, an overall network bandwidth, and/or an overall computing performance. The system 100 may be further utilized to represent the holistic feature 132 by a vector 134 in the parameter space 128. In certain embodiments, the vector 134 is a linear combination of the vectors 130-1 through 130-*n*. The system 100 may be further utilized to determine a volume 136 in the parameter space 128 based on the plurality of constraints 122**. The volume may have a shape of a multi-dimensional rectangle, which may be also referred to as a hyperrectangle or an orthotope.

In certain embodiments, the system 100 may be further utilized to determine vectors 138, such that each vector 138 is determined by subtracting a vector (e.g., a respective one of the vectors 130-1 through **130-*n*) representing a respective unit (e.g., a respective one of the units 114-1 through 114-*n*) from the vector 134 representing the holistic feature 132. The vectors 138 define respective points 140 in the parameter space 128. The system 100 may be further utilized to determine distances 142, such that each distance 142 is a distance between a point 140 defined by a respective vector 138 and the volume 136, and a minimum distance 144 from the distances 142. The system 100 further determines a unit 146 that corresponds to the minimum distance 144. The unit 146 may be any of the units 114-1 through 114-*n***.

In certain embodiments, the system 100 may be further utilized to transform the data population 112 into an updated data population 152 by removing the unit 146 that corresponds to the minimum distance 144 from the data population 112. The system 100 may be further utilized to determine an updated holistic feature 148 of the updated data population 152. The updated holistic feature 148 is represented by a vector 150, such that the vector 150 a linear combination of vectors that represent units of the updated data population 152. In an embodiment when the removed unit 146 is the unit 114-1, the vectors that represent units of the updated data population 152 may include the vectors 114-2 through **114-*n*. In other words, the unit 146 is a unit of the data population 112 removal of which moves the vector 150 representing the updated holistic feature 148 closest to the volume 136. Accordingly, the updated holistic feature 148 is moved closest to a desired range defined by the constraints 122**.

In certain embodiments, the system 100 may be further utilized to continue removing further units of the data population 112 as described above until the updated holistic feature 148 is within the volume 136. In other words, units of the data population 112 are removed until the updated holistic feature 148 is within a desired range defined by the constraints 122. The latest updated data population defines a final data population 154. The final data population 154 includes a maximum number of units that have a holistic feature that is within a desired range defined by the constraints 122.

In certain embodiments, when the data population 112 includes interaction data for a plurality of data values, the final data population 154 includes data for a maximum number of shares that have the overall projected gain within a desired range defined by the constraints 122. In certain embodiments in which the data population 112 includes demographic data for a plurality of persons, the final data population 154 includes data for a maximum number of persons that have the overall political lean within a desired range defined by the constraints 122. In certain embodiments in which the data population 112 includes computing data for a plurality of computing nodes of a computing system, the final data population 154 may include data for a maximum number of nodes that have the overall memory consumption within a desired range defined by the constraints 122, the overall network bandwidth within a desired range defined by the constraints 122, and/or the overall computing performance within a desired range defined by the constraints 122.

Minimizing Control System Disturbances

Figure 2:
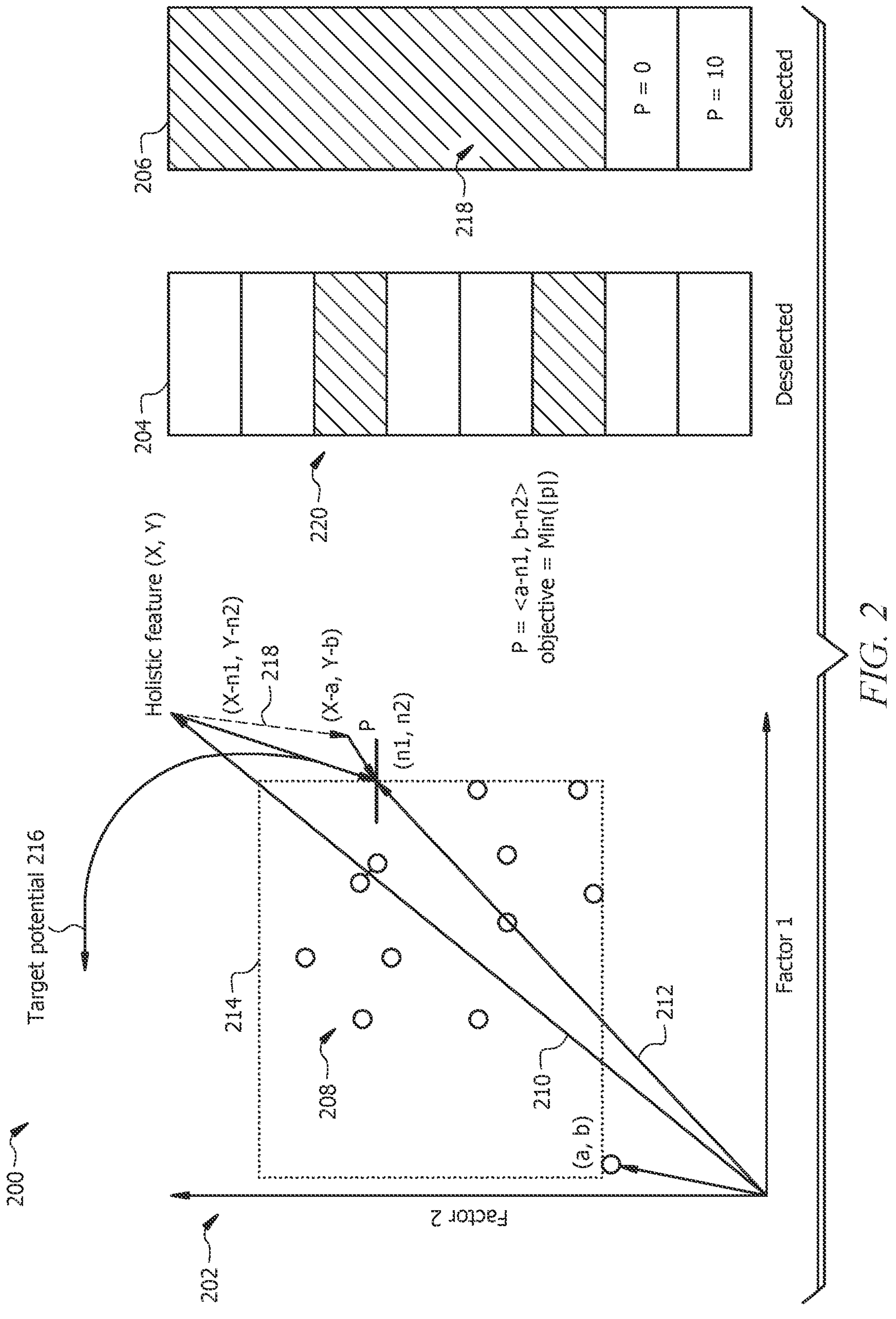
FIG. 2 is a plot diagram illustrating the convergence of a holistic feature and a current holistic feature to minimize control system disturbances, in accordance with certain aspects of the present disclosure
Figure 3A:
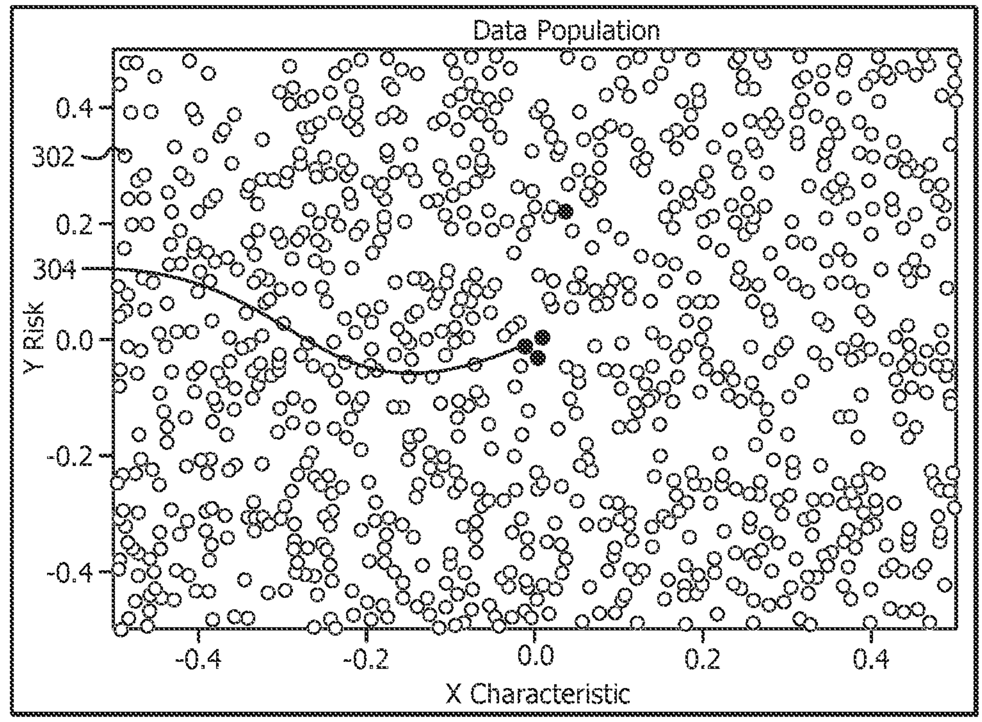
FIGS. 3A-3D is a graphic diagram illustrating the minimizing of control system disturbances, in accordance with certain aspects of the present disclosure.
Figure 3B:
Figure 3B:
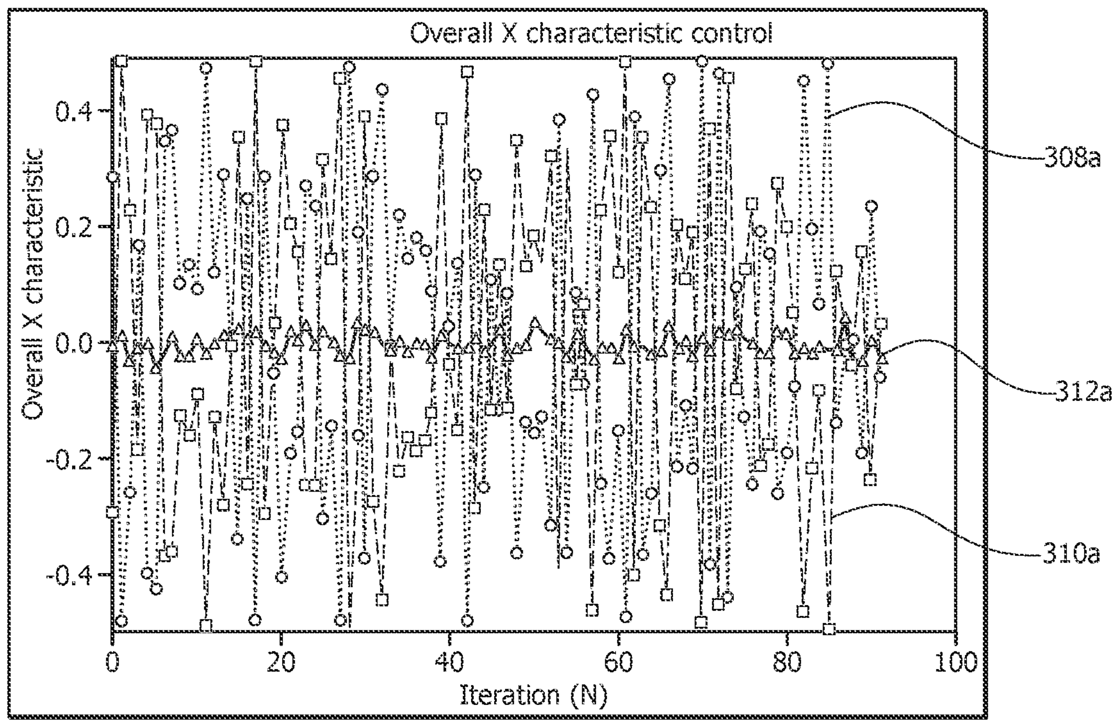
Figure 3C:
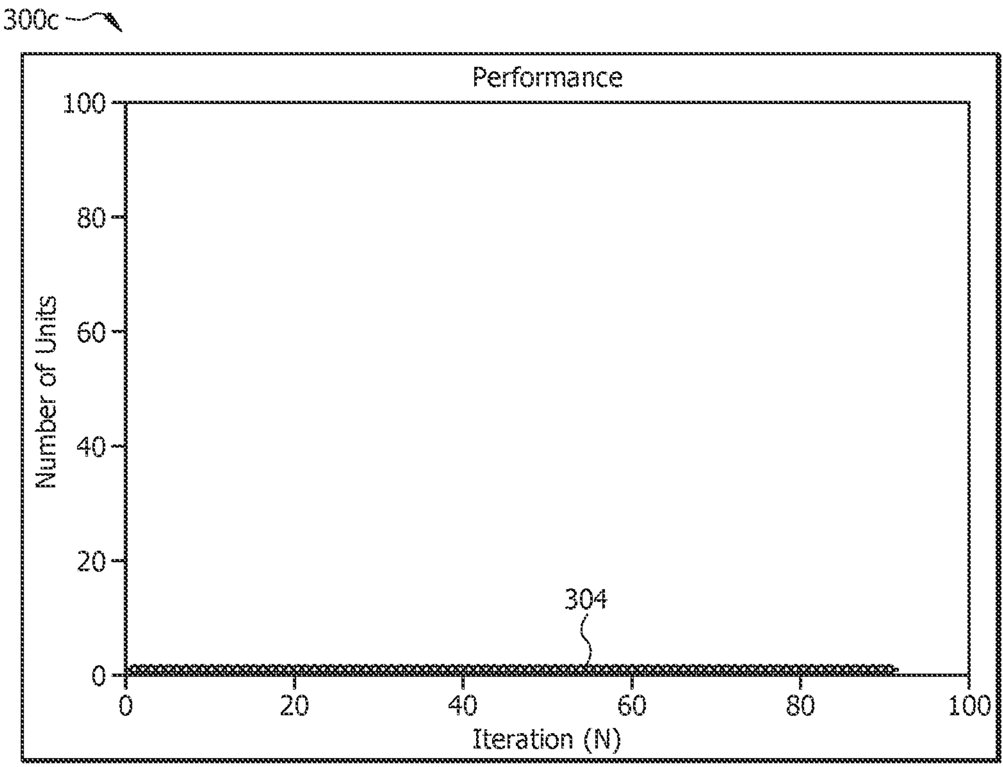
Figure 3D:
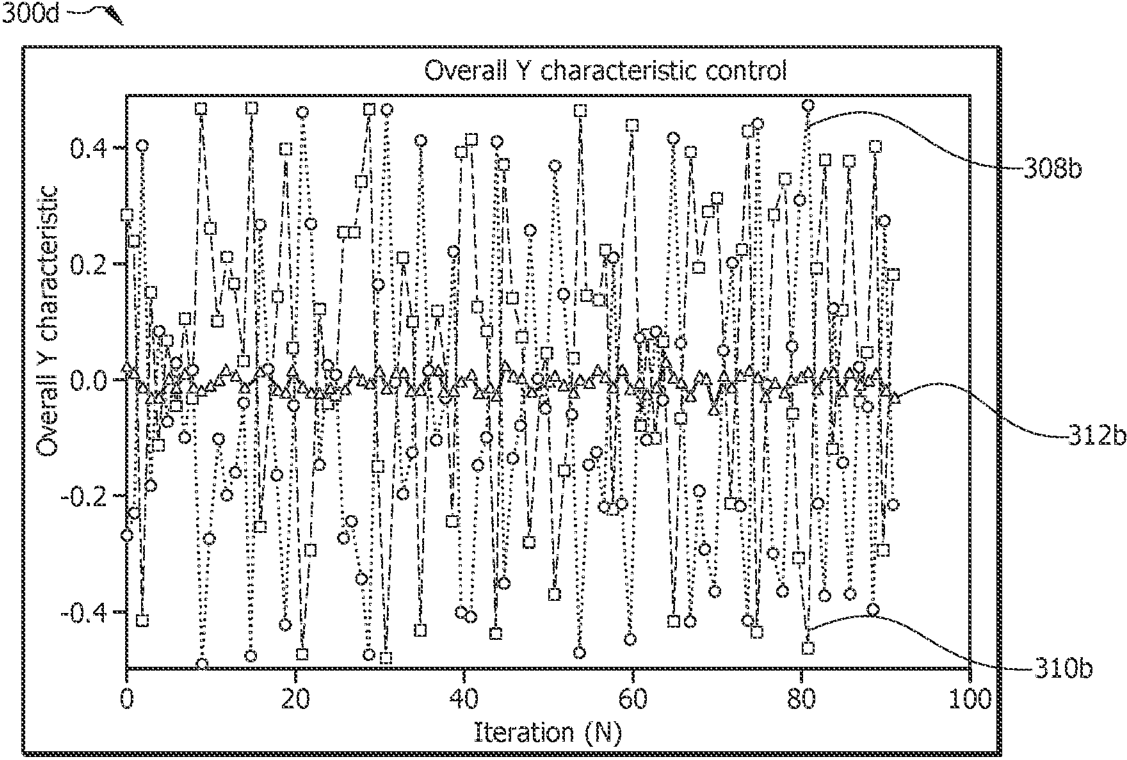

FIG. 2 is a plot diagram 200 illustrating the convergence of a holistic feature and a current holistic feature to minimize control system disturbances, in accordance with certain aspects of the present disclosure. As depicted, in certain embodiments, the plot diagram 200 may include a plot 202 illustrating the convergence of a holistic feature and a current holistic feature to minimize control system disturbances, a first data bucket 204, and a second data bucket 206. In one embodiment, the first data bucket 204 may be identical to the first data bucket 113 and the second data bucket 206 may be identical to the second data bucket 115, as each discussed above with respect to FIG. 1. In certain embodiments, as depicted by FIG. 2, the plot 202 may include an m-dimensional parameter space, which may include a number of units 208 corresponding to a data population. For example, the number of units 208 may be alternatively represented by linear vectors 215.

In certain embodiments, a holistic feature 210 may be representative of a sum of all of the number of units 208 and/or linear vectors 215. In certain embodiments, a target volume 214 may be defined in the plot 202 (e.g., parameter space). In one embodiment, the holistic feature 210 may extend beyond the target volume 214 in accordance with, for example, a system disturbance as described herein. Thus, in certain embodiments, a target offset 212 (e.g., "P" guiding vector) may be defined, in which the target offset 212 (e.g., "P" guiding vector) includes a vector to which the present techniques seek to cause the holistic feature 210 to converge. In certain embodiments, the first data bucket 204 may be instantiated, in which each partition of a number of partitions 220 of the first data bucket 204 may correspond to a respective one of the number of units 208.

Specifically, in certain embodiments, the linear vectors 215 corresponding to the number of units 208 may be subtracted or added as negative values (e.g., as represented by dashed vector 218) iteratively until the holistic feature 210 converges to the target offset 212 (e.g., "P") so as to cause the holistic feature 210 to be positioned wholly within the target volume 214. In certain embodiments, the linear vectors 215 corresponding to the number of units 208 may be subtracted or added as negative values (e.g., as represented by dashed vector 218) iteratively until the holistic feature 210 converges to the target offset 212 (e.g., "P") by computationally selecting or transferring units of the number of units 208 corresponding to the number of partitions 220 of the first data bucket 204 to a number of partitions 222 of the second data bucket 206.

In certain embodiments, once the holistic feature 210 converges to the target offset 212 (e.g., "P") and is positioned wholly within the target volume 214, the units of the number of units 208 corresponding to the number of partitions 220 that remain in the first data bucket 204 collectively represent a maximum number of units corresponding to the data population that includes the converged holistic feature. Further, once the holistic feature 210 converges to the target offset 212 (e.g., "P") and is positioned wholly within the target volume 214, system disturbances as described herein may be mitigated and dampened. In this way, the present embodiments may improve the operability, reliability, and maintainability of control systems by minimizing (e.g., dampening) the effects of control system disturbances, which would otherwise adversely impact and impede the operation and service of control systems.

FIGS. 3A-3D are graphic diagrams 300A, 300B, 300C, and 300D illustrating the minimizing of control system disturbances, in accordance with certain aspects of the present disclosure. In certain embodiments, the graphic diagrams 300A, 300B, 300C, and 300D may include a graphical result of the computational techniques discussed above with respect to FIG. 2. For example, the graphic diagram 300A includes data population units 302 and target offset units 304. The graphic diagrams 300B and 300D show XY system disturbance outputs 308A, 308B, XY target offset outputs 310A, 310B, and XY resulting outputs 312A, 312B all over N iterations.

In accordance with the presently disclosed embodiments, the XY resulting outputs 312A, 312B may include the result of the XY target offset outputs 310A, 310B, for example, being added to the XY system disturbance outputs 308A, 308B to minimize (e.g., dampen) the effects of the XY system disturbance outputs 308A, 308B by offsetting the XY system disturbance outputs 308A, 308B based on a minimum number of target offset units 304. The graphic diagram 300C shows the minimum number of target offset units 304 over N iterations. Thus, the present embodiments may ensure that one or more characteristics associated with a system are maintained within predetermined characteristic thresholds even in the occurrence of one or more system disturbances (e.g., as illustrated by the XY resulting outputs 312A, 312B of graphic diagrams 300B and 300D).

Figure 4:
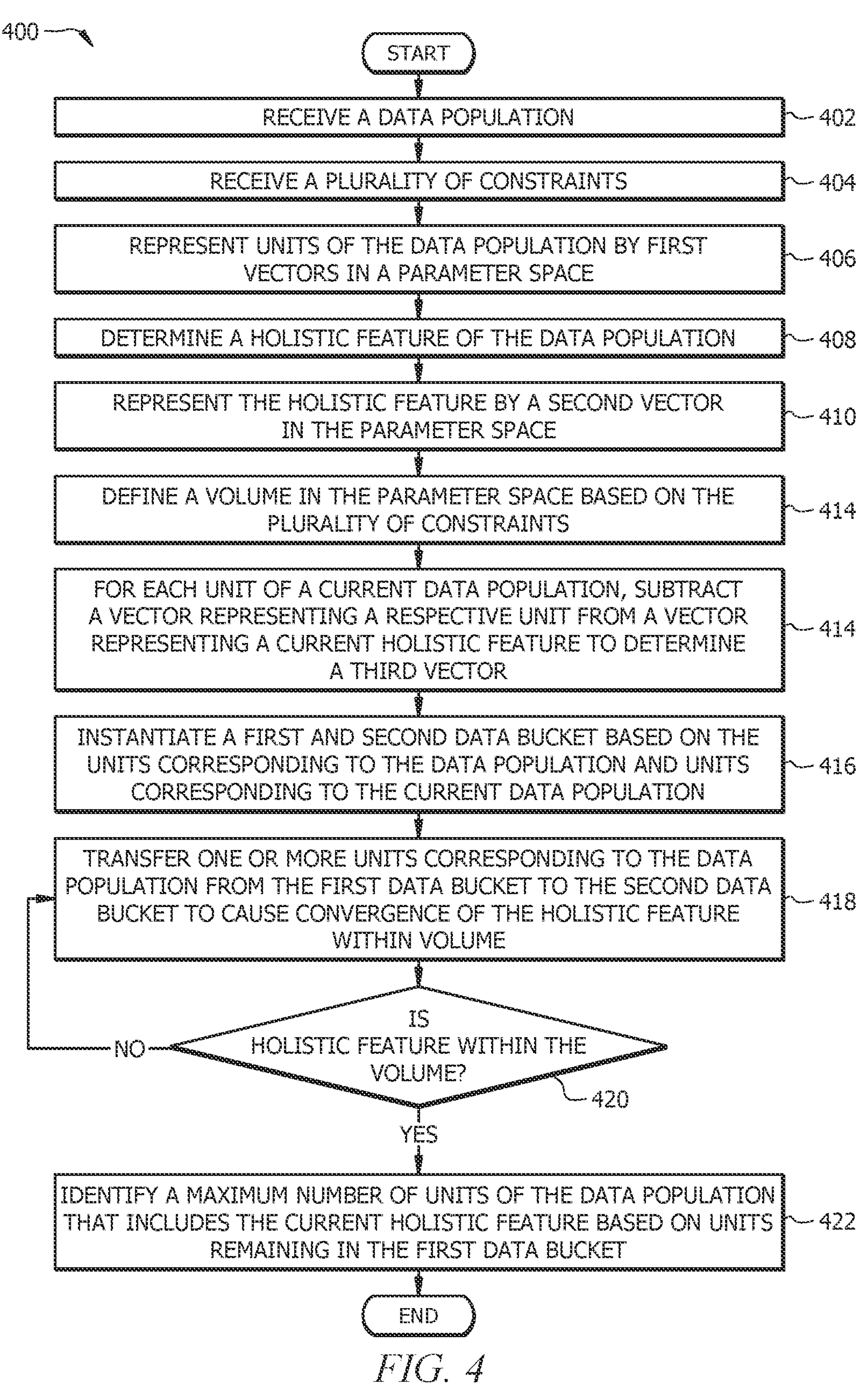
FIG. 4 illustrates a flowchart of an example method for minimizing control system disturbances, in accordance with one or more embodiments of the present disclosure.

FIG. 4 illustrates a flowchart of an example method 400 for minimizing control system disturbances, in accordance with one or more embodiments of the present disclosure. The method 500 may be performed by the system 100 including a control system and network as described above with respect to FIG. 1. The method 400 may begin at block 402 with the system 100 receiving a data population (e.g., data population 112 of FIG. 1). In certain embodiments, the data population includes a plurality of units (e.g., units 114-1 through 114-*n* of FIG. 1). Each unit of the data population includes a plurality of values (e.g., values 118-1 through 118-*m* of FIG. 1), such that each value corresponds to a respective parameter (e.g., parameters 116-1 through 116-*m* of FIG. 1).

In certain embodiments, the data population 112 may include interaction data for a plurality of data values and the plurality of parameters 116-1 through 116-*m* may include interaction parameters. In other embodiments, the data population 112 may include demographic data for a plurality of persons and the plurality of parameters 116-1 through 116-*m* may include demographic parameters. In yet other embodiments, the data population 112 may include computing data for a plurality of computing nodes of a computing system and the plurality of parameters 116-1 through 116-*m* may include computing parameters (e.g., a computing performance, a memory, and/or a network bandwidth).

In certain embodiments, the method 400 may continue at block 404 with the system 100 receiving a plurality of constraints (e.g., constraints 122 of FIG. 1). The constraints may include minimum values (e.g., minimum values 124-1 through 124-*m* of FIG. 1) and maximum values (e.g., maximum values 126-1 through 126-*m* of FIG. 1) that correspond to respective parameters. The method 400 may continue at block 406 with the system 100 representing units of the data population by first vectors (e.g., vectors 130-1 through 130-*m* of FIG. 1) in a parameter space (e.g., parameter space 128 of FIG. 1). The parameter space may be a multi-dimensional vector space. For example, in one embodiment, the parameter space may include a two-dimensional (2D) space of all real numbers. In another embodiment, the parameter space may include a three-dimensional (3D) space of XYZ coordinates.

In certain embodiments, the method 400 may continue at block 408 with the system 100 determining a holistic feature (e.g., holistic feature 132 of FIG. 1) of the data population. For example, the holistic feature may be determined from all of the units of the data population. In certain embodiments in which the data population includes interaction data for a plurality of data values, the holistic feature may be an overall projected gain. In certain embodiments in which the data population includes demographic data for a plurality of persons, the holistic feature may be an overall political lean.

In certain embodiments in which the data population includes computing data for a plurality of computing nodes of a computing system, the holistic feature may be an overall memory consumption, an overall network bandwidth, and/or an overall computing performance.

In certain embodiments, the method 400 may continue at block 410 with the system 100 representing the holistic feature by a second vector (e.g., vector 134 of FIG. 1) in the parameter space. In certain embodiments, the second vector is a linear combination of the first vectors. In certain embodiments, the method 400 may continue at block 412 with the system 100 defining a target volume (e.g., target volume 214 of FIG. 2) in the parameter space based on at least a subset of the plurality of constraints. In one embodiment, the volume may have a shape of a multi-dimensional (e.g., m-dimensional) rectangle, which may be also referred to as a hyperrectangle or an orthotope. In one embodiment, the target volume 214, for example, may be defined in the parameter space based at least in part on a random sampling of the plurality of constraints 122.

In certain embodiments, the method 400 may continue at block 414 with the system 100, for each unit of a current data population (e.g., data population 112 of FIG. 1), subtracting a vector (e.g., a respective one of vectors 130-1 through **130-*n* of FIG. 1) representing a respective unit (e.g., a respective one of units 114-1 through 114-*n* of FIG. 1) from a vector (e.g., vector 134 of FIG. 1) representing a current holistic feature (e.g., holistic feature 132 of FIG. 1) to determine a third vector (e.g., a respective one of vectors 138 of FIG. 1). In one embodiment, the third vectors may define respective points (e.g., points 140 of FIG. 1**) in the parameter space.

In certain embodiments, the method 400 may continue at block 416 with the system 100 instantiating a first data bucket (e.g., first data bucket 113 of FIG. 1) and a second data bucket (e.g., second data bucket 115 of FIG. 1) based at least in part on the plurality of units corresponding to the data population and the units corresponding to the current data population. For example, in one embodiment, the first data bucket may include the plurality of units corresponding to the data population. In certain embodiments, the method 400 may continue at block 418 with the system 100, for each third vector, transferring one or more of the plurality of units corresponding to the data population from the first data bucket to the second data bucket so as to cause the holistic feature to converge to the current holistic feature defined at least in part by the target volume.

In certain embodiments, the method 400 may continue at decision 420 with the system 100 determining whether the holistic feature is positioned within the target volume. For example, in certain embodiments, when the holistic feature 210 is positioned within the target volume 214, the first data bucket 113 may include a maximum number of units corresponding to the data population that includes the current holistic feature. Specifically, in response to determining at decision 420 that the holistic feature 210 is not positioned within the target volume 214, the method 400 may return to block 418 with the system 100 transferring additional units of the plurality of units corresponding to the data population from the first data bucket 113 to the second data bucket 115. In one embodiment, the system 100 may iteratively transfer units of the plurality of units corresponding to the data population from the first data bucket 113 to the second data bucket 115 until the holistic feature 210 is wholly positioned within the target volume 214.

On the other hand, in response to determining at decision 420 that the holistic feature 210 is positioned within the target volume 214, the method 400 may conclude at block 422 with the system 100 identifying a maximum number of the data population that includes the current holistic feature based on the units remaining in the first data bucket 113. For example, in one embodiment, at the point at which the holistic feature 210 is positioned wholly within the target volume 214, the first data bucket 113 includes a maximum number of units corresponding to the data population that includes the current holistic feature.

In certain embodiments in which the data population includes interaction data for a plurality of data values, the final data population may include data for a maximum number of data values that have the overall projected gain within a desired range defined by the constraints. In certain embodiments in which the data population includes demographic data for a plurality of persons, the final data population may include data for a maximum number of persons that have the overall political lean within a desired range defined by the constraints. In certain embodiments in which the data population includes computing data for a plurality of computing nodes of a computing system, the final data population may include data for a maximum number of nodes that have the overall memory consumption within a desired range defined by the constraints, the overall network bandwidth within a desired range defined by the constraints, and/or the overall computing performance within a desired range defined by the constraints.

Accordingly, as generally described by the foregoing, the present embodiments are directed to systems and methods for minimizing control system disturbances. In certain embodiments, a control system may be utilized to control one or more signal characteristics associated with a system. For example, in one embodiment, the control system may be utilized to maintain the one or more signal characteristics associated with the system within a number of signal characteristic thresholds. For example, in one embodiment, one or more signals associated with the system may include a normal distribution, and thus the number of signal characteristic thresholds may include a mean signal threshold and a standard deviation signal threshold.

However, in some instances, the one or more signal characteristics may be subjected to one or more control system disturbances, which may cause the one or more signal characteristics associated with the system markedly deviate beyond the number of signal characteristic thresholds. Thus, in accordance with the presently disclosed embodiments, it may be useful to provide a target offset signal to be added to the one or more signals associated with the system to minimize (e.g., dampen) the effects of the control system disturbances, such that the one or more signal characteristics associated with the system is maintained within the number of signal characteristic thresholds even in the occurrence of one or more control system disturbances. In this way, the present embodiments may improve the operability, reliability, and maintainability of control systems by minimizing (e.g., dampening) the effects of control system disturbances, which would otherwise adversely impact and impede the operation and service of control systems.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system, comprising:

a memory configured to store a data population and a plurality of constraints, wherein the data population comprises a plurality of units, wherein each unit comprises a plurality of respective values, wherein each value corresponds to a respective parameter, and wherein each of the plurality of constraints corresponds to a respective parameter; and a processor communicatively coupled to the memory, wherein the processor is configured to:

receive the data population and the plurality of constraints;

represent the plurality of units corresponding to the data population by a first set of vectors in a parameter space;

determine a holistic feature of the data population;

represent the holistic feature by a second vector in the parameter space, wherein the second vector comprises a linear combination of the first set of vectors;

define a target volume in the parameter space based at least in part on a subset of the plurality of constraints;

for each unit of the plurality of units corresponding to a current data population, subtract a vector representing a respective unit from a vector representing a current holistic feature to determine a third vector, wherein the vector representing the current holistic feature is a linear combination of vectors that represent the units corresponding to the current data population;

instantiate a first data bucket and a second data bucket based at least in part on the plurality of units corresponding to the data population and the units corresponding to the current data population, wherein the first data bucket comprises the plurality of units corresponding to the data population; and for each third vector, transfer one or more of the plurality of units corresponding to the data population from the first data bucket to the second data bucket so as to cause the holistic feature to converge to the current holistic feature defined at least in part by the target volume.

2. The system of claim 1, wherein the processor is further configured to define the target volume in the parameter space based at least in part on a random sampling of the plurality of constraints.

3. The system of claim 1, wherein the processor is further configured to iteratively transfer one or more of the plurality of units corresponding to the data population from the first data bucket to the second data bucket until the holistic feature is positioned within the target volume.

4. The system of claim 3, wherein, when the holistic feature is positioned within the target volume, the first data bucket comprises a maximum number of units corresponding to the data population that includes the current holistic feature.

5. The system of claim 1, wherein, prior to the transfer of the one or more of the plurality of units corresponding to the data population from the first data bucket to the second data bucket, the second data bucket comprises an empty data bucket.

6. The system of claim 1, wherein the holistic feature is determined based on a maximum number of the plurality of units corresponding to the data population.

7. The system of claim 1, wherein each parameter comprises one or more of a data parameter, a demographic parameter, a computer parameter, or an interaction parameter.

8. A method, by one or more processors, comprising:

receiving a data population and a plurality of constraints, wherein the data population comprises a plurality of units, wherein each unit comprises a plurality of respective values, wherein each value corresponds to a respective parameter, and wherein each of the plurality of constraints corresponds to a respective parameter;

representing the plurality of units corresponding to the data population by a first set of vectors in a parameter space;

determining a holistic feature of the data population;

representing the holistic feature by a second vector in the parameter space, wherein the second vector comprises a linear combination of the first set of vectors;

defining a target volume in the parameter space based at least in part on a subset of the plurality of constraints;

for each unit of the plurality of units corresponding to a current data population, subtracting a vector representing a respective unit from a vector representing a current holistic feature to determine a third vector, wherein the vector representing the current holistic feature is a linear combination of vectors that represent the units corresponding to the current data population;

instantiating a first data bucket and a second data bucket based at least in part on the plurality of units corresponding to the data population and the units corresponding to the current data population, wherein the first data bucket comprises the plurality of units corresponding to the data population; and for each third vector, transferring one or more of the plurality of units corresponding to the data population from the first data bucket to the second data bucket so as to cause the holistic feature to converge to the current holistic feature defined at least in part by the target volume.

9. The method of claim 8, further comprising defining the target volume in the parameter space based at least in part on a random sampling of the plurality of constraints.

10. The method of claim 8, further comprising iteratively transferring one or more of the plurality of units corresponding to the data population from the first data bucket to the second data bucket until the holistic feature is positioned within the target volume.

11. The method of claim 10, wherein, when the holistic feature is positioned within the target volume, the first data bucket comprises a maximum number of units corresponding to the data population that includes the current holistic feature.

12. The method of claim 8, wherein, prior to the transfer of the one or more of the plurality of units corresponding to the data population from the first data bucket to the second data bucket, the second data bucket comprises an empty data bucket.

13. The method of claim 8, wherein the holistic feature is determined based on a maximum number of the plurality of units corresponding to the data population.

14. The method of claim 8, wherein each parameter comprises one or more of a data parameter, a demographic parameter, a computer parameter, or an interaction parameter.

15. A non-transitory computer-readable medium storing instructions that when executed by one or more processors cause the one or more processors to:

receive a data population and a plurality of constraints, wherein the data population comprises a plurality of units, wherein each unit comprises a plurality of respective values, wherein each value corresponds to a respective parameter, and wherein each of the plurality of constraints corresponds to a respective parameter;

represent the plurality of units corresponding to the data population by a first set of vectors in a parameter space;

determine a holistic feature of the data population;

represent the holistic feature by a second vector in the parameter space, wherein the second vector comprises a linear combination of the first set of vectors;

define a target volume in the parameter space based at least in part on a subset of the plurality of constraints;

for each unit of the plurality of units corresponding to a current data population, subtract a vector representing a respective unit from a vector representing a current holistic feature to determine a third vector, wherein the vector representing the current holistic feature is a linear combination of vectors that represent the units corresponding to the current data population;

instantiate a first data bucket and a second data bucket based at least in part on the plurality of units corresponding to the data population and the units corresponding to the current data population, wherein the first data bucket comprises the plurality of units corresponding to the data population; and for each third vector, transfer one or more of the plurality of units corresponding to the data population from the first data bucket to the second data bucket so as to cause the holistic feature to converge to the current holistic feature defined at least in part by the target volume.

16. The non-transitory computer-readable medium of claim 15, wherein the instructions further cause the one or more processors to define the target volume in the parameter space based at least in part on a random sampling of the plurality of constraints.

17. The non-transitory computer-readable medium of claim 15, wherein the instructions further cause the one or more processors to iteratively transfer one or more of the plurality of units corresponding to the data population from the first data bucket to the second data bucket until the holistic feature is positioned within the target volume.

18. The non-transitory computer-readable medium of claim 17, wherein, when the holistic feature is positioned within the target volume, the first data bucket comprises a maximum number of units corresponding to the data population that includes the current holistic feature.

19. The non-transitory computer-readable medium of claim 15, wherein, prior to the transfer of the one or more of the plurality of units corresponding to the data population from the first data bucket to the second data bucket, the second data bucket comprises an empty data bucket.

20. The non-transitory computer-readable medium of claim 15, wherein the holistic feature is determined based on a maximum number of the plurality of units corresponding to the data population.

* * * * *